(12) United States Patent
Zhu

(10) Patent No.: US 9,954,670 B2
(45) Date of Patent: Apr. 24, 2018

(54) FRAME BIT DETECTOR IN NEAR FIELD COMMUNICATIONS

(71) Applicant: Intel IP Corporation, Santa Clara, CA (US)

(72) Inventor: Jie Zhu, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 2 days.

(21) Appl. No.: 14/753,616

(22) Filed: Jun. 29, 2015

(65) Prior Publication Data
US 2016/0380750 A1 Dec. 29, 2016

(51) Int. Cl.
*H04B 5/00* (2006.01)
*H04L 7/00* (2006.01)
*H04L 1/00* (2006.01)
*G06F 11/07* (2006.01)

(52) U.S. Cl.
CPC .......... *H04L 7/0016* (2013.01); *G06F 11/076* (2013.01); *G06F 11/0709* (2013.01); *H04B 5/0031* (2013.01); *H04L 1/0045* (2013.01); *H04L 1/0054* (2013.01)

(58) Field of Classification Search
CPC . G06F 11/0709; G06F 11/076; H04B 5/0031; H04L 1/0054; H04L 7/0016
USPC ....................................... 455/41.1
See application file for complete search history.

(56) References Cited

U.S. PATENT DOCUMENTS

| 6,560,303 | B1* | 5/2003 | Fan | ......................... H04L 7/042 370/509 |
| 2012/0275642 | A1* | 11/2012 | Aller | ................ H04M 1/72522 382/100 |
| 2014/0086347 | A1 | 3/2014 | Kang | |
| 2014/0173387 | A1 | 6/2014 | Park et al. | |

FOREIGN PATENT DOCUMENTS

WO 2004/042989 A1 5/2004

OTHER PUBLICATIONS

Office Action received for Korean Patent Application No. 10-2016-0065451, dated Apr. 19, 2017, 8 pages of Korean Office Action including 3 pages of English Translation.
Extended European Search Report received for European Patent Application No. 16173606.1, dated Nov. 9, 2016, 9 pages.

* cited by examiner

*Primary Examiner* — Eugene Yun
(74) *Attorney, Agent, or Firm* — Schiff Hardin LLP

(57) ABSTRACT

Described herein are architectures, platforms and methods for (NFC) frame bit detection. A frame bit detector includes a sample-based bit detector that receives samples which may be data and non-data (noise), identifies data bits at every sample input time, and the likelihoods that the identified data bits are part of data. The frame detector includes a maximum likelihood frame detector configured to receive bits from the sample-based bit detector and the likelihood of each bit that the bit is data, and calculate frame likelihood.

10 Claims, 5 Drawing Sheets

FRAME BIT DETECTOR IN NEAR FIELD COMMUNICATIONS

BACKGROUND

For near field communication or NFC enabled devices, data transfers may take place between such NFC devices and passive tags. The NFC device may be a reader/writer that communicates with the passive tags. The passive tag receives power from the NFC device to begin the communication. A relatively strong carrier signal may be used to power the passive tag. At the same time power is provided to the passive tag, the NFC device listens for a load modulated signal from the passive tag. In such instances, the so-called load modulation index which measures the amplitude difference between the modulated and unmodulated portions of the carrier signal used to power the passive tag could be less than 0.25%.

The described mode of operation may place significant design requirements for the load modulated signals with such a small load modulation index. In particular, such design requirements may necessitate the use of relatively higher cost analog to digital converters (ADC), such as a 12 bit ADC, and low noise front-end analog circuits.

An NFC device can include a poller. Such a poller can implement a load demodulator followed by a frame detector (which can include an edge detector) for detection of data frames. With the demodulated baseband signals from the load demodulator, the detection of a data frame during an NFC transaction, may involve the following. A frame arrival detection stage is performed by an "edge detector" that reports arrival of data frame arrival when an input sample is larger than a preset threshold. A frame bit detection stage is performed after arrival of a frame is detected. Frame bit detection performance is mainly determined by the false alarm and missing probabilities of the frame arrival of the edge detector and timing recovery accuracy.

Typically, bit boundary detection in bit pollers relies on edge detection and timing recovery. Since an edge detector is sample-based, the edge detector may have to work in low noise environments in order to perform. It is desirable for the edge detector to achieve a low frame miss rate and low false alarm probability. For example, timing recovery is capable of correcting up to +/−16 sample errors, which may be a subcarrier cycle from the frame start as determined by the edge detector. If an error is larger than 16 samples, the timing recovery cannot correct the error, and the frame will be missed.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
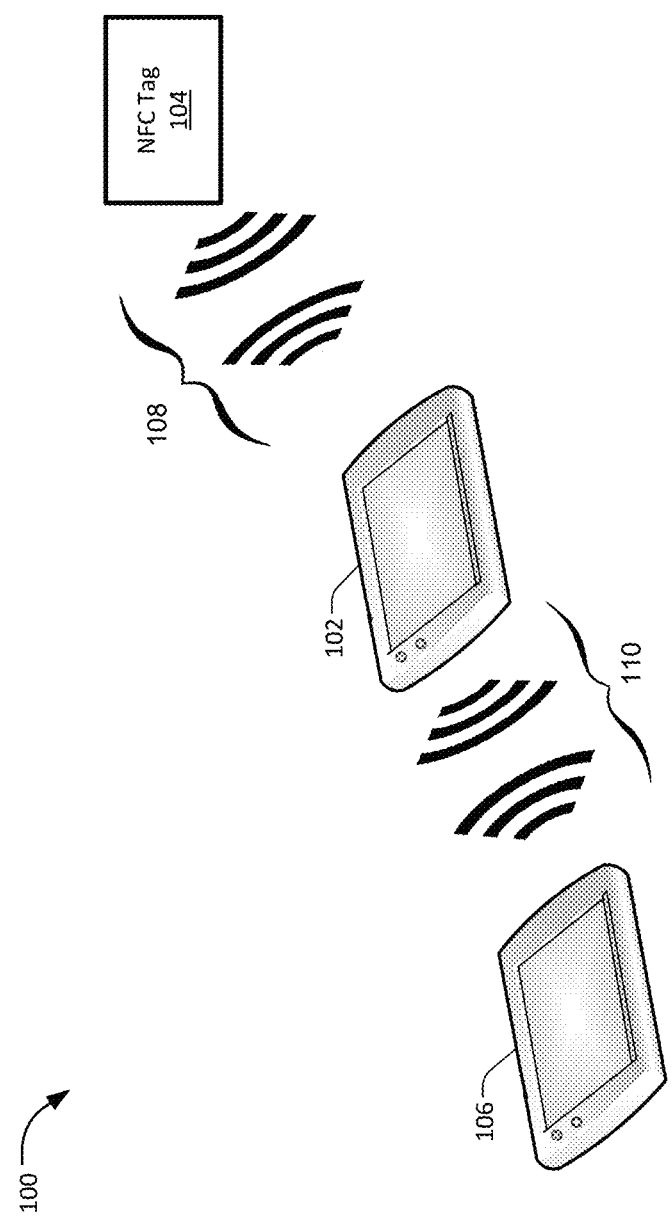
FIG. 1 is an example scenario illustrating a near field communication (NFC) communication using frame/frame bit detection as described in implementations herein.

Described herein are architectures, platforms and methods frame bit detection of data in near field communications (NFC).

Frame bits are detecting without using edge detection and timing recovery. In certain implementations, an NFC bit poller (i.e., frame bit detector) detects the bits of a NFC data frames. A "bit" may be detected by using the latest input samples in a bit duration when an input sample arrives at the frame bit detector. The input samples may or may not be a bit from NFC communication frame. If the input signal is noise, the "bit" is still detected as either 1 or 0 but without any physical meaning. But if the detected bit is obtained from samples belonging to more than one bit, then the value of the detected bit may be wrong. Bits are detected at all possible locations of the bit boundary of the data frame. The Start of frame (SoF) of the data frame is detected and confirmed after a certain number of frame bits are detected. Since the detection of SoF is based on information involved in a certain number of bits, for example up to 512 samples, a relatively larger number of samples may lead to greater accuracy in frame bit detection.

Timing recovery for searching the bit boundary may be performed by an edge detector before the bits are detected. The bit boundary is the first sample position of a bit in a digital signal that also implies the previous sample being the last sample of previous bit. If a bit spans N samples in a baseband signal, then all samples between two adjacent bit boundaries represent a bit. These samples may be vary depending upon the bit rate, bit coding scheme and load modulation method. Using the ISO-A standard, basic bitrate as an example, a bit is first coded by Manchester coding scheme and then modulated by a subcarrier whose frequency is 8 times of the bitrate. If the sampling frequency of the digital baseband signal is 16 times of the subcarrier frequency, then a bit in this example will span 128 samples, and a subcarrier spans 16 samples. The first 64 samples and the last 64 samples may be or may not be modulated by the subcarrier based on the bit value. If the bit value is 1, the first 64 samples are modulated by the subcarrier and the last ones are not. The 128 samples of a bit with value equal to 1 will ideally have two values: one represents load modulation and the other does not. The number of modulated samples is 128/4=32 and that of unmodulated samples is 96. The timing recovery is to locate the bit boundary for detecting a bit from all its samples. If the output of the time recovery has some number of samples offset, then the bit may not be correctly detected. It is the intent, to detect bits at all possible bit boundary locations therefore no timing recovery is needed.

FIG. 1 is an example scenario 100 that illustrates a near field communication (NFC) device 102 communicating with an NFC card/tag 104 and another NFC device 106. The NFC device 102 particularly includes an NFC frame bit detector or bit poller (not shown) that implements frame bit detection as described herein. NFC communication between NFC device 102 and NFC card/tag 104 is represented by wireless communication 108. NFC communication between NFC device 102 and NFC device 106 is represented by wireless communication 110.

NFC card/tag 104 may be a passive device that requires NFC device 102 to provide power to NFC card/tag 104. Such power transmission may be performed when NFC device 102 and NFC card/tag 104 are communicating with one another. NFC device 106 may have its own power source and needs no power from NFC device 102 when communicating. Regardless of power requirements, NFC card/tag 104 and NFC device 106 provide NFC data communication to NFC device 102. NFC device 102 processes the received NFC signal and detects the information data or frame bits from NFC card/tag 104 and device 106. Furthermore, other signal or noise may be received and processed by NFC device 102 simultaneously. Such signal or noise will degrade the above NFC communication performance and is the main challenge in the development of the frame bit detector in device 102.

Figure 2:
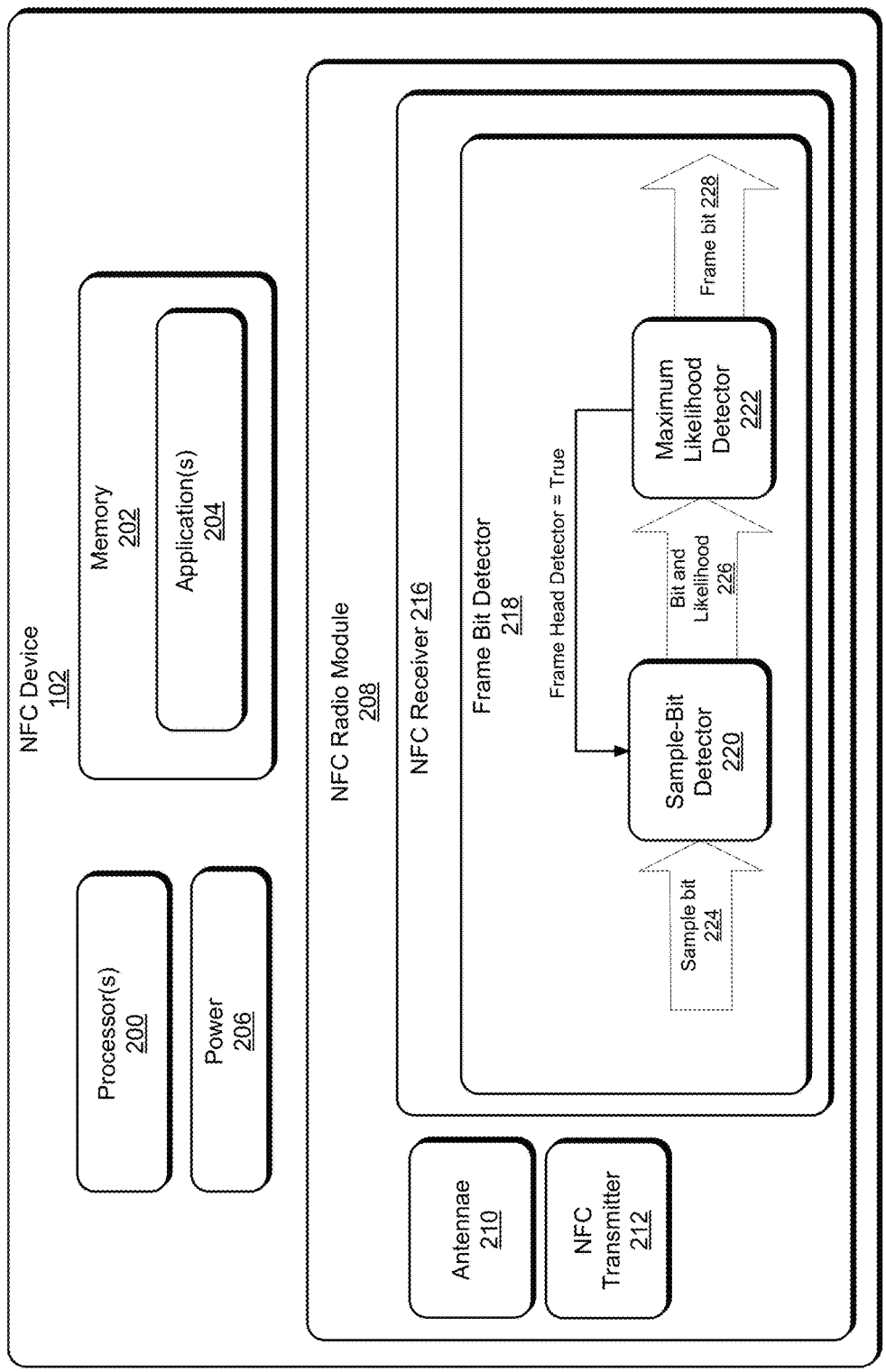
FIG. 2 is an example block diagram of a near field communication (NFC) device that implements frame/frame bit detection as described in implementations herein.

FIG. 2 shows an example NFC device 102 that implements frame bit detection. The NFC device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. Furthermore, the NFC device 102 may include, but is not limited to, non-portable devices such as a personal computer, nor limited to wireless devices such as when connected through a cable.

The NFC device 102 includes one or more processors 200, and memory 202 coupled to the one or more processors. Memory 202 can be non-transitory memory/media that includes various types of storage, including read only, random access and the like. Memory 202 may also include programming/non-programmable firmware. Particular elements described herein as hardware may be implanted as firmware as part of memory 202. Memory 202 may particularly include applications 204 which may be NFC enabled software/firmware applications.

The NFC device 102 may include a power component 206. Power component 206 may include various AC and/or DC elements, such as batteries. Power component 206 drives and provides power to various other components of NFC device 102, including power amplifiers. In certain implementations, using NFC communications, power component 206 provides power to passive devices (e.g., NFC card/tag 104) through electromagnetic field.

The NFC device 102 may include an NFC radio controller or radio module 208. The NFC radio module 208 is used to communicate with other NFC enabled devices, including the NFC card/tag 104 and NFC device 106. In particular, NFC radio module 208 transmits and receives NFC communication. The NFC radio module 208 may include one or more antennae 210, an NFC transmitter 212 and NFC Receiver 216. When NFC device 102 acts as a poller and other device 106 or card/tag 104 as a listener, the NFC device 102 generates the electromagnetic field around the NFC device 102 to provide energy to the NFC listener. The NFC device 102 sends data by modulating the field and detects data from the NFC listener by monitoring the load modulation of the field.

In this implementation, the NFC radio module 208 includes an NFC receiver 216. The NFC receiver 216 includes a frame bit detector 218 that may implement the data frame/frame bit detection methods described herein. Frame bit detector 218 includes a sample-based bit detector 220 and maximum likelihood (ML) detector 222. The sample-based bit detector 220 receives a sample 224. The sample 224 may be from data (i.e., part of a data frame) or non data (e.g., noise). The sample-based bit detector 220 outputs the bit and the bit's likelihood that the bit is actual data, as represented by arrow 226. Bit likelihood may be based on the minimum distance to the point of constellation of bits, or decision error. The sample-based bit detector 220 always assumes the current sample is at a "bit boundary", and detects the bit value with a number of N latest available samples in a bit duration. Sampling is repeated as shown in the flow to ML detector 222.

The ML detector 222 receives the bit and the bit's likelihood that the bit is actual data, as represented by arrow 226, and computes frame likelihood with bit likelihoods. The ML detector 222 further determines if a frame or partial frame arrives. If a frame is detected, feedback is provided to the sample-based bit detector 220 for reducing the computation load. The ML detector 222 outputs actual frame bits 228 that is sent by the NFC listener. Frame arrival detection may be determined by the number of bits with bit likelihoods that have a larger value than some threshold AVG from noise, where NFC frame structure information is used for frame arrival detection.

Figure 3:
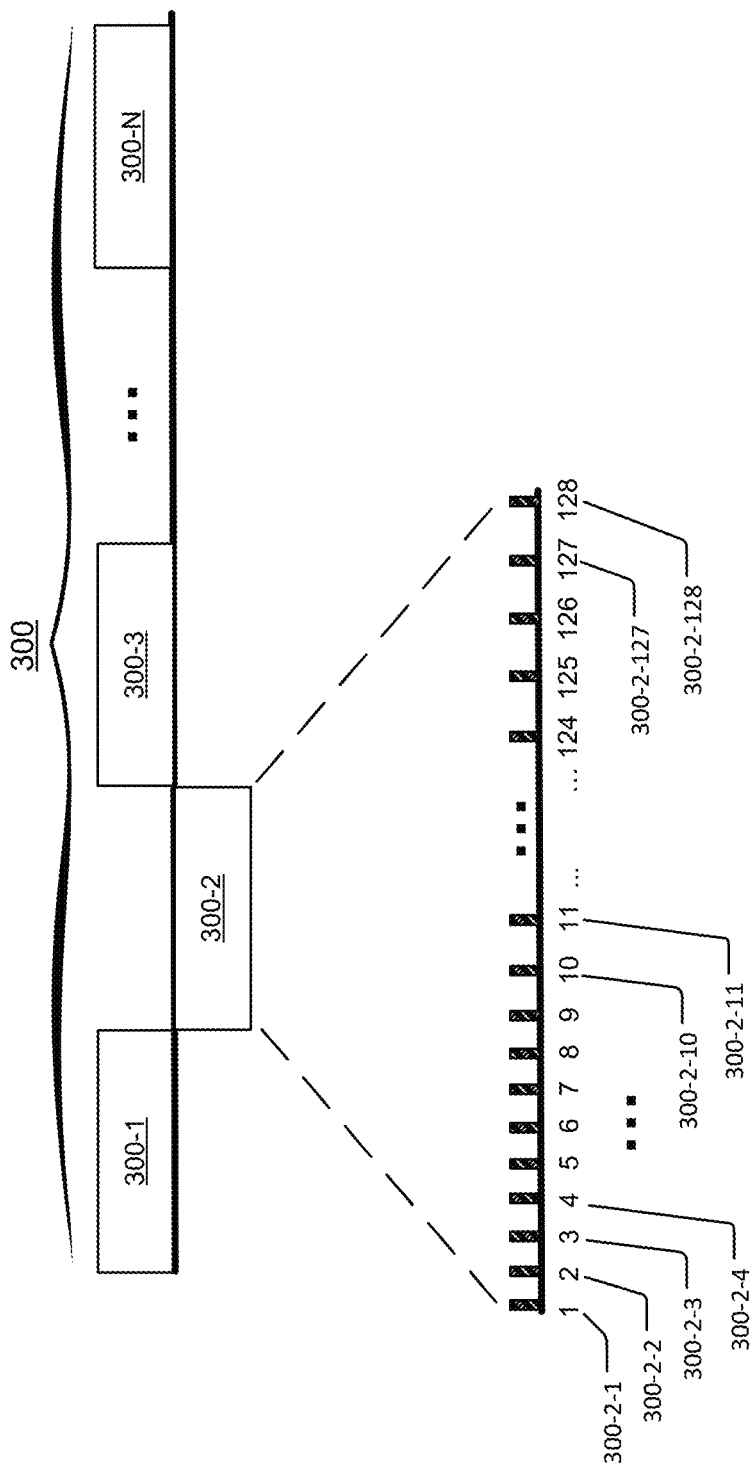
FIG. 3 is an example shows an example data frame 300 as described in present implementations herein.

FIG. 3 shows an example of NFC data frame 300. Data frame 300 may be seen as a bit package communicated between NFC devices. In particular, NFC device 102 receives signal samples of data frame 300. Data frame 300 is made of N bits. For example, data frame 300 may be a 256 bits where N is 256.

At the NFC receiver 216 the received signal is sampled with sampling frequency. The sampling frequency may be multiple times of bitrate. For example, 128 times of bitrate if the sampling frequency equals to the carrier frequency. After demodulated, each bit of data frame 300 may include multiple samples. In particular, a number of samples may represent each bit of data frame 300. In the example shown in FIG. 3, the sampling frequency is equal to the carrier frequency. A bit includes 128 samples. For example, bit 300-2 has 128 samples which are represented by 300-2-1 to 300-2-128.

Referring back to FIG. 2, the NFC device 102, and the NFC frame bit detector 218 in particular, may postpone frame bit detection output for a certain number of bits. Unlike other communication systems where usage efficiency of a carrier frequency spectrum is a key vector of baseband signal design, efficiency of baseband signals in NFC are directed more towards bit transmission liability. Therefore, a bit is generally represented by numerous samples (e.g., 128 samples for a bit 300-2). In general, carrier modulation for NFC communications is amplitude modulation.

The input to the NFC receiver 216 of NFC device 102 may be a load modulated signal. The modulating signal may be defined as a subcarrier with a frequency Fc/16 for bitrate up to 848 k, and Fc/8~Fc/2 for higher bitrates (very high bit rate or VHBR). Modulating may be on/off keying (OOK) or binary phase shift keying (BPSK). An information bit in a received signal (data frame) at NFC receiver 216 may be represented by a group of subcarrier cycles. For example, an OOK load-modulated signal as defined by ISO-A having a basic rate, implements eight subcarrier cycles to represent an information bit. A logic one is represented by first four cycles on and last four cycles off. A logic zero is coded by first four cycles off and last four cycles on. For a VHBR, a bit may be represented by eight, four, or two subcarrier cycles depending upon the bitrate that is used.

For BPSK modulated signals, the phase of a logic one is $\pi$ different to the phase of logic zero. In certain implementations, sample-based bit detector 220 at NFC receiver 216 is based on the detection of a group of subcarrier cycles which represents the same bit value. The frame bit detector 218 detects the start bit or start of frame (SoF), in addition to actual bits.

In implementations, detecting a bit value at an input sample is performed, and a check is made if the start of frame (SoF) has already arrived a preset number of bits before. The present number may be denoted as P.

Several criteria may be used to detect the SoF. One criterion may be that all of consecutive P bit-likelihoods are larger than the average bit-likelihood from noise (blocks 420-424 of FIG. 4B below further demonstrates such criterions). Another criterion may be that the bit-likelihood of SoF is to be larger than the maximum of noise and at least n (less than P) bit-likelihoods larger than the average of noise in these P bit-likelihoods. A bit-likelihood may be designed based on the correlation of the received waveform with a subcarrier for bit duration, or the error of the bit signal to the decision point in the constellation.

Correlation may imply the result of received waveform correlating with a nominal subcarrier cycle whose half cycle are all "1" and others are all "−1." For the ISO-A basic rate, a bit includes 8 subcarrier cycles with either first four on and last four off, or first four off and last four on. The bit-likelihood of this technology is the absolute value of the difference between the correlations of the first and last four subcarrier cycles.

The smaller the likelihood (or absolute value), the larger the error probability of the bit detection. For bit rates other than the ISO-A basic bit-rate, the bit value is represented by the phase of subcarrier phase. The bit-likelihood may be defined by the absolute value of correlation of all subcarrier cycles. As discussed, a larger likelihood may mean a smaller error probability for bit detection.

SoF detection is continued at every one or more input samples if some cost trade-off is made until SoF is found or stopped by firmware. The final output frame bits may start from the found SoF with the maximal sum of all bit-likelihoods. It may be seen that frame bits with a maximum sum of bit-likelihood implies bit-boundary correctness.

For sake of simplicity, an assumption may be made but not limited to that a modulated subcarrier signal is sampled with NFC carrier frequency Fc=13.56 MHz (typical operating frequency of NFC communications). The subcarrier frequency may be Fc/L where L is one of elements in $\{2, 4, 8, 16\}$. The term x(k) may be denoted as the sample of the demodulated waveform at time k obtained by sampling rate Fc, and C(n) as the correlation of the current received waveform with a nominal subcarrier cycle where n=k % M, where % is a modulus operator and M is the number of input samples in a bit duration.

In the example using the basic bit rate of ISO-A, N=8 and L=16, and M=N*L=128. Therefore, C(k % M)=S(k)−S(k−L/2) where S(k)=x(k)+x(k−1)+ . . . +x(k−L/2+1). C(n) for n=0, 1, . . . , M−1 is the primary parameter used to determine optimal bits detection results, and is a cycle buffer with length M, C(n)≡C(n-M) for any integer n.

In the example using the basic bit rate of ISO-A, a bit spans eight C(k)'s. In certain subcarrier modulations (i.e, OOK), define G(n)=C(n)+C(n−L)+C(n−2L)+C(n−3L)−C(n−4L)−C(n−5L)−C(n−6L)−C(n−7L) where n=k % M. In certain NFC communications, where the subcarrier is BPSK modulated, define G(n)=C(n)+C(n−L)+ . . . +C(n−(N−1)*L). A bit is detected to be one (or zero) if G(n)≥0, or zero (or one) otherwise. The bit-likelihood is defined as the absolute value of G(n), H(n)=|G(n)|. For every k, a bit B(k)=sign(G(n)) is obtained where sign(s) is the sign of s. A data frame is made up of bits B(k), B(k−M), . . . , B(k−mM) where m is a positive integer and M=N*L is the number of samples in a bit. There are M possible solutions of the frame bits detection. For each of these possible solutions, frame-likelihood may be defined as F(k % M)=β*F(k % M)+(1−β)*H(k), where 0<β<1 is a programmable parameter. The value of β is relevant to the number of the target frames.

The maximum frame-likelihood indicates the related frame bits are the best choice if the frame has been transmitted. If the input samples are noise, the maximal frame-likelihood is still there, but no frame bits should be reported. Therefore, a criterion for detecting a frame arrival or SoF may be needed. Detecting SoF may be implemented by applying frame structure knowledge. For example, SoF for the ISO-A basic rate, is logic 1 and end of frame (EoF) is logic 0. SoF for non ISO-A basic rate may include 32 subcarrier cycles and one logic 0. A general consideration may be based on the fact that the bit-likelihood of a bit tends to be larger than that from noise. Therefore, when there is no frame transmission, some statistical parameters of bit-likelihoods from environment noise, such as the average, maximum and standard deviation, are computed. One general criterion may be that the SoF is detected as long as all bit-likelihoods after SoF are larger than the average likelihood from noise. If long delay is allowed, the criterion can increase the number of check bits to reduce further the false alarm probability.

Figure 4A:
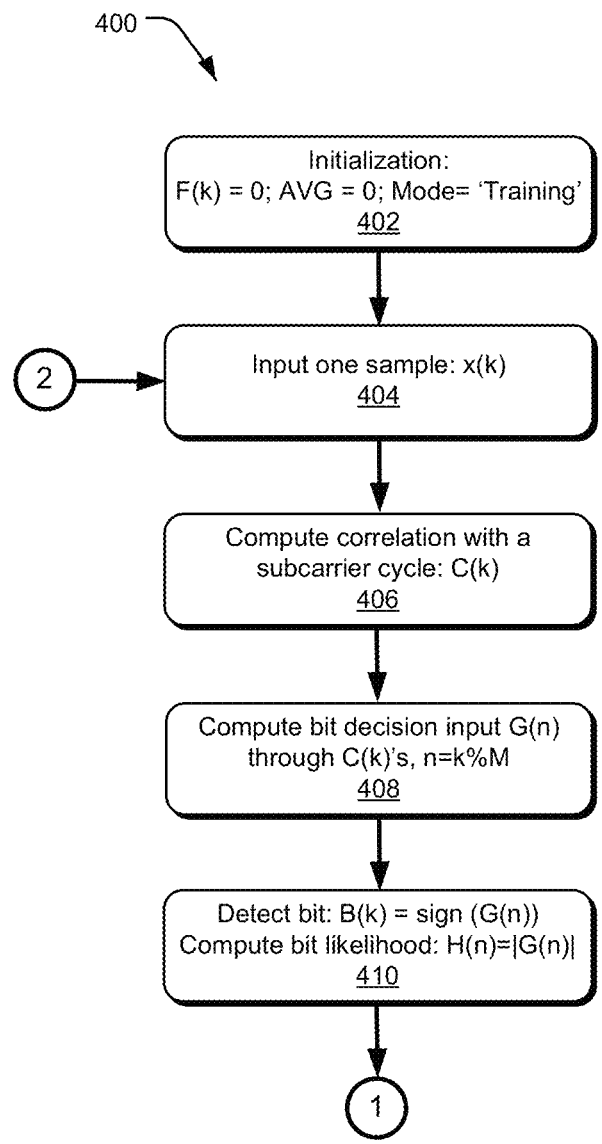
FIGS. 4A and 4B is an example process flow illustrating an example method for frame bit detection.
Figure 4B:
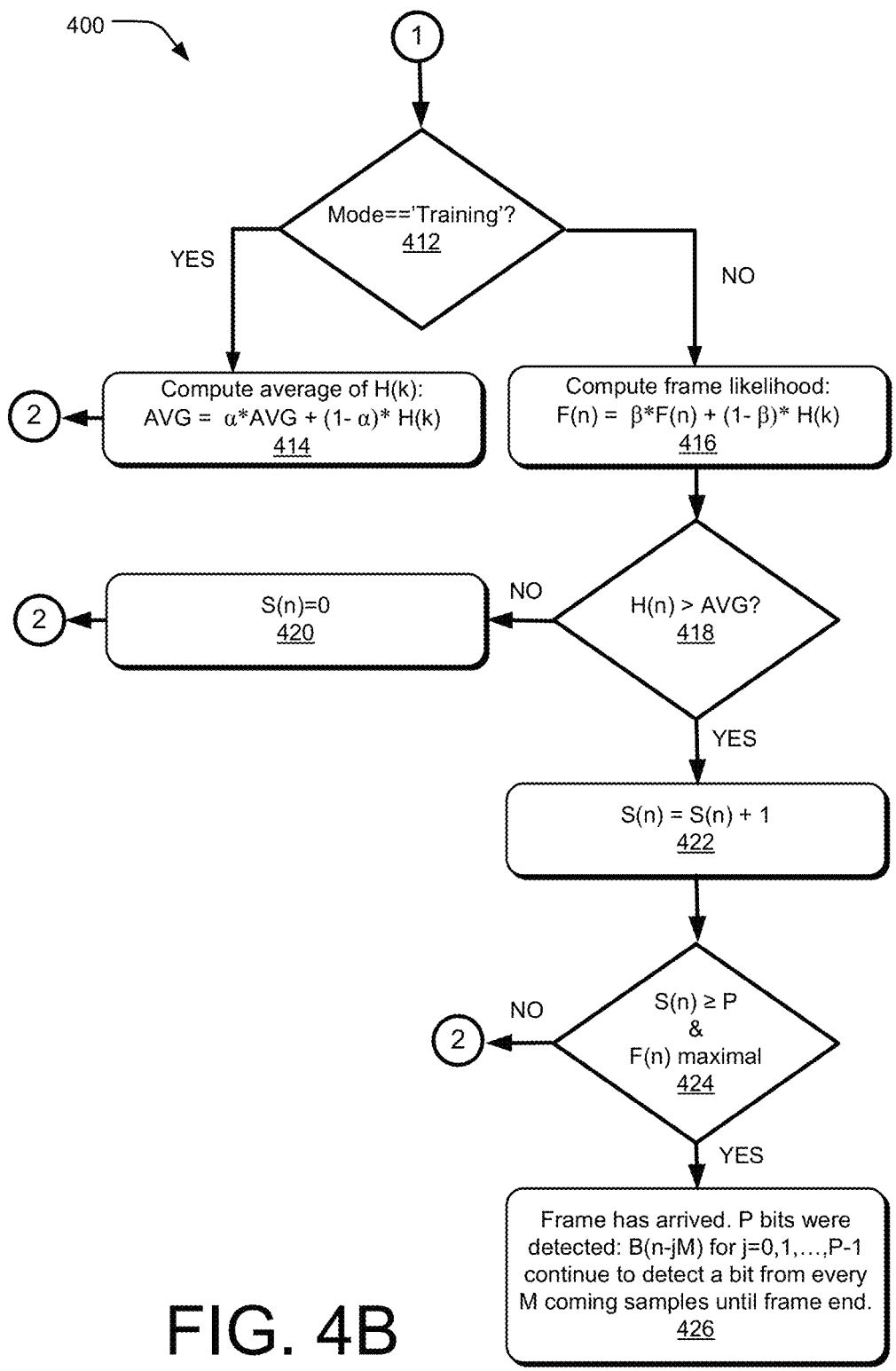

FIG. 4 shows an example process flow 400 illustrating an example method for frame bit detection. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Process flow 400 may be implemented by firmware to set to either training mode or detection mode. The training mode is to determine the average of bit-likelihood while no frame is transmitted, and is denoted as AVG. The training mode may be bypassed and AVG is set based on historical information or environments. AVG is used to check if the related bit is not from noise. For example, 8 consecutive bits with bit-likelihood larger than AVG will be used to decide if a frame arrives in the example. Depending upon the frame structure to be detected, the number of consecutive bits P can be other numbers. After the arrival of frame was confirmed, this information may be fed back to sample-based bit detector (e.g., sample-based bit detector 220). The remaining bits detection becomes straightforward: starting from the time the frame was confirmed, using every M samples to compute the correlation parameter C(k) thus bit decision one G(k). The sign of G(k) will give the bit value.

In an implementation, the process flow 400 may be performed by frame bit detector 218. In particular, blocks 402 to 410 may be performed by sample-based bit detector 220, and blocks 412 to 426 may be performed by maximum likelihood detector 222.

For the following process flow 400, the variable L is defined as the number of input samples in a subcarrier cycle. For example, for an ISO-A basic rate, L=16. The variable N is defined as the number of subcarrier cycles in a bit-duration. For example, for an ISO-A basic rate, N=8. The variable M is the number of samples within a bit duration. The input digital signal may be assumed to be sampled with a carrier frequency Fc, of 13.56 MHz, and M=L*N. For example, for an ISO-A basic rate, M=128. The variable P is defined as the number of consecutive bits whose bit-likelihoods are all larger than the average of noise, AVG. P should not be larger than the number of all frame bits. Ideally, the larger value of P, the better. The variable k is used as a sample index and is a positive integer. The index k may also be referred to as a time stamp. The variable n is defined as a value $0 \leq n < M$, where $n = k \% M$.

At block 402, $F(k)=0$ for all $k=0, 1, \ldots, M-1$. $F(k)$ is defined as an array. For a fixed k, $F(k)$ represents the frame likelihood of the $k^{th}$ detected frame bits-sequence. All frame likelihoods are positive. The frame likelihood with the maximum value may be determined as the best estimate of the M frame bits-sequences.

Mode may be set to "training" at initialization. Mode may be reset in order to exit the training mode and enter into frame detection. In certain implementations, the mode may be set and reset by firmware.

At block 404, one sample of an input digital x(k), is accepted.

At block 406, L is set to the number of samples in a subcarrier cycle. Correlation of the input signal with subcarrier at time k, C(k) is computed by the following steps:
1) $Sp=x(k)+Sp-x(k-L/2)$; $Sn=x(k-L/2)+Sn-x(k-L)$ where Sp and Sn are zero at beginning.
2) $C(n)=Sp-Sn$ where $n=k \% M$ and % is modulus operator, $0 \leq n < M$.

At block 408, decision parameter G(n) is computed. G(n) is used for bit detection and is defined by the bit coding scheme. Let $n=k \% M$. G(n) is computed by the following depending on signal type.
1) If the signal to be detected is ISO-A, basic rate, then $G(n)=C(n)+C(n-L)+C(n-2L)+C(n-3L)-C(n-4L)-C(n-5L)-C(n-6L)-C(n-7L)$
2) If the signal to be detected is BPSK subcarrier modulated, then $G(n)=C(n)+C(n-L)+ \ldots +C(n-(N-1)*L)$.

At block 410, detection of the bit value at time k, B(k) and computing the bit likelihood H(k) is performed.
1) B(k) is said to be 1 if $G(n) > 0$, otherwise B(k) is 0 where $n=k \% M$
2) H(k) is the absolute value of G(k), such that $H(n)=|G(n)|$ and $n=k \% M$ At block 412, a determination is made as to either training mode or detection (e.g., detection mode as controlled by firmware). Training is directed to calculating an AVG value for bit likelihoods of noise.

If in training mode, following the YES branch of block 412, at block 414, the mean of bit likelihood H(k) for noise input samples is computed using the following: $AVG=\alpha*AVG+(1-\alpha)*H(k)$, where $0<\alpha<1$ is a programmable parameter and may be referred to as a "forget factor". The training mode should be disabled before the NFC listener starts its transmission.

If the training mode is finished, or is not required due to AVG is known or copied from history. In this case, the mode should be set to other than "training" and following the NO branch of 412, at block 416, frame likelihood at time k is computed using the following: $F(n)=\beta*F(n)+(1-\beta)*H(k)$ where $n=k \% M$ and $0<\beta<1$ is a programmable parameter. β may be referred to as a "forget factor."

At block 418, a determination is made if the current bit likelihood H(k) is not larger than AVG. If so, the determination may indicate that the current detected bit may come from noise. When H(k) is not larger than AVG, following the NO branch of block 418, at block 420, the counter parameter S(n) is reset or cleaned up. In particular, $S(n)=0$.

If H(k) is larger than AVG, then following the YES branch of block 418, at block 422 $S(n)=S(n)+1$, where $n=k \% M$.

The value of S(n) represents the number of consecutive bits whose bit likelihood are all larger than the noise average bit-likelihoods, AVG.

At block 424, a determination is made if the real frame has been detected. For example, the determination may include a criterion that $S(n) \geq P$ and the frame likelihood F(n) is the maximum among all F(k) for $k=0, 1, \ldots, M-1$. If the criterion is not met, then following the NO branch of block 424, a next input sample is taken. At this block frame structure information may be applied for the determination. For example, in ISO-A basic rate the SoF is 1 and EoF is 0. The criteria may include to check if SoF bit is 1 in the detected frame with maximum F(n). The SoF is the first bit if the current bit is at bit P, i.e. B(n–PM+M). If the target frame has parity bit, the parity check may be applied to the determination. The parity check should be correct before the arrival of the frame is decided.

If the criterion is met, then following the YES branch of block 424, at block 426, the detection result is outputted. The output P detected frame bits which have been detected are: B(n), B(n–M), . . . , B(n–PM+M). The frame arrival information is fed back to the sample-based bit detector for reducing computation if needed. For example, if the bit boundary is seen unchanged, then the sample-based bit detector may detect a bit at its last sample only, not at every input sample. Specifically, suppose F(m) is the maximum at block 426, then at every bit boundary or the sample x(k) where k satisfies $m=k \% M$, a bit of the actual frame is detected from the latest M samples. In this case, the correlation parameter C(m+jL) is computed for every L input samples for $j=1, 2, \ldots, N$, and G is obtained from these C(m+jL)'s after L*N samples arrive. The sign of G is the detected bit value. The steps of block 404-410 are performed at actual bit boundary for each bit until the frame finishes.

The following examples pertain to further embodiments:

Example 1 is a near field communication (NFC) enabled device comprising: an NFC receiver comprising an frame bit detector comprised of: a sample-based bit detector configured to receive demodulated samples obtain from data and non-data, identify data bits at every sample input time, and the likelihoods that the identified data bits are part of data; and a maximum likelihood frame detector configured to receive bits from the sample-based bit detector and the likelihood of each bit that the bit is data, and calculate frame likelihood.

In example 2, the NFC enabled device of example 1, wherein the sample-based bit detector is configured to calculate bit likelihood based on bit decision error which is a minimum distance to a point in a constellation of bits.

In example 3, the NFC enabled device of example 1 wherein the sample-based bit detector is configured to calculate the value of a bit through a slicer, with an input quantity computed by received samples in a bit duration based on a bit coding scheme.

In example 4, the NFC enabled device of example 3 wherein the sample-based bit detector is configured to compute the input quantity to the slicer which is modified from a previous input quantity with current input sample before the signal of frame arrival is not valid.

In example 5, the NFC enabled device of example 1 wherein the maximum likelihood frame detector is configured to identify full frame or partial frame at every bit arrival from the sample-based bit detector.

In example 6, the NFC enabled device of example 1 wherein the maximum likelihood frame detector is configured to calculate frame likelihood by a moving sum of the bit likelihoods of detected data bits sharing a same bit boundary timing.

In example 7, the NFC enabled device of example 1 wherein the maximum likelihood detector is further configured to identify frame arrival based on a number of bit likelihoods larger than an average (AVG) value that is estimated when no communication is conducted or given by other software and hardware modules.

In example 8, the NFC enabled device of example 1 wherein the maximum likelihood detector is further configured to feedback a signal of frame arrival to sample-based bit detector after frame arrival is identified.

In example 9, the NFC enabled device of example 1 wherein the sample-based bit detector is further configured to use signal of frame arrival to reduce power consumption by detecting a bit at the arrival of the last sample of the bit, wherein the last sample of a bit is identified by the timing of a signal of frame arrival.

In example 10, the NFC enabled device any of examples 1 to 9 wherein the sample-based bit detector is configured to output all possible results of all received bits at every sample input time, independent of whether the received bits are data or non-data.

Example 11 is a method of determining frame bits comprising: calculating bit value and bit likelihood that the received bit is part of bit frame based on an identified average likelihood value average (AVG), wherein the AVG is a threshold value separating data from noise; and calculating frame likelihood after receiving a number of bits and a plurality of bit likelihood values.

In example 12, the method of example 11 wherein bit value is completed by a decision quantity defined by a bit coding scheme.

In example 13, the method of example 11 wherein calculating frame likelihood is performed based on receiving a number of detected bits and a plurality of bit likelihood values.

In example 14, the method of example 11, wherein calculating frame likelihood further comprises calculating whether a frame is a full frame or partial frame.

In example 15, the method of example 11 further comprising calculating the AVG based on a number of bit likelihood values of detected bits from noise.

In example 16, the method of any of examples 11 to 15 wherein calculating frame likelihood is based on a plurality of bit likelihood values of bits with the same bit boundary timing.

Example 17 is non-transitory computer readable media to perform method comprising: receiving samples that comprise data bits and non data bits; identifying for each of the received samples, a bit likelihood that represents a probability that a received sample is a data bit in a data frame; and identifying a frame likelihood based on the received samples and their associated bit likelihoods.

In example 18, the non-transitory computer readable media of example 17, wherein the receiving of samples and the identifying of their associated bit likelihoods bits in the data frame is performed, regardless of whether the bits are data bits or non data bits.

In example 19, the non-transitory computer readable media of example 17, wherein identifying bit likelihood is based on a minimum distance to a constellation of bits.

In example 20, the non-transitory computer readable media of example 17 further comprising identifying if a detected bit value is from a correct bit boundary of a data frame.

In example 21, the non-transitory computer readable media of any of examples 17 to 20, wherein identifying a frame likelihood comprises calculating whether a frame is a full frame or partial frame.

What is claimed is:

1. A near field communication (NFC) enabled device, comprising:
   an NFC receiver comprising a frame bit detector comprised of:
      a sample-based bit detector configured to receive demodulated samples obtained from data and non-data, identify data bits at every sample input time, and the likelihoods that the identified data bits are part of data; and
      a maximum likelihood frame detector configured to receive bits from the sample-based bit detector and the likelihood of each bit that the bit is data, and calculate frame likelihood.

2. The NFC enabled device of claim 1, wherein the sample-based bit detector is configured to output all possible results of all received bits at every sample input time, independent of whether the received bits are data or non-data.

3. The NFC enabled device of claim 1, wherein the sample-based bit detector is configured to calculate bit likelihood based on bit decision error which is a minimum distance to a point in a constellation of bits.

4. The NFC enabled device of claim 1, wherein the sample-based bit detector is configured to calculate the value of a bit through a slicer, with an input quantity computed by received samples in a bit duration based on a bit coding scheme.

5. The NFC enabled device of claim 4, wherein the sample-based bit detector is configured to compute the input quantity to the slicer which is modified from a previous input quantity with current input sample before the signal of frame arrival is not valid.

6. The NFC enabled device of claim 1, wherein the maximum likelihood frame detector is configured to identify full frame or partial frame at every bit arrival from the sample-based bit detector.

7. The NFC enabled device of claim 1, wherein the maximum likelihood frame detector is configured to calculate frame likelihood by a moving sum of the bit likelihoods of detected data bits sharing a same bit boundary timing.

8. The NFC enabled device of claim 1, wherein the maximum likelihood detector is further configured to identify frame arrival based on a number of bit likelihoods larger than an average (AVG) value that is estimated when no communication is conducted or given by other software and hardware modules.

9. The NFC enabled device of claim 1, wherein the maximum likelihood detector is further configured to feedback a signal of frame arrival to sample-based bit detector after frame arrival is identified.

10. The NFC enabled device of claim 1, wherein the sample-based bit detector is further configured to use signal of frame arrival to reduce power consumption by detecting a bit at the arrival of the last sample of the bit, wherein the last sample of a bit is identified by the timing of a signal of frame arrival.

* * * * *